United States Patent
Walker et al.

(10) Patent No.: US 8,628,414 B2
(45) Date of Patent: Jan. 14, 2014

(54) ENHANCED COMMENTARY SYSTEM FOR 3D COMPUTER ENTERTAINMENT

(75) Inventors: Robin Walker, Kirkland, WA (US);
Gregory Coomer, Seattle, WA (US);
Erik Axel Johnson, Issaquah, WA (US)

(73) Assignee: Valve Corporation, Bellevue, WA (US)

( * ) Notice: Subject to any disclaimer, the term of this patent is extended or adjusted under 35 U.S.C. 154(b) by 1280 days.

(21) Appl. No.: 11/775,733

(22) Filed: Jul. 10, 2007

(65) Prior Publication Data

US 2008/0015003 A1 Jan. 17, 2008

Related U.S. Application Data

(60) Provisional application No. 60/807,446, filed on Jul. 14, 2006.

(51) Int. Cl.
*A63F 13/00* (2006.01)

(52) U.S. Cl.
USPC ............... 463/31; 463/1; 463/2; 463/30

(58) Field of Classification Search
USPC ..................... 463/2, 9, 23, 30, 31
See application file for complete search history.

(56) References Cited

U.S. PATENT DOCUMENTS

| | | | |
|---|---|---|---|
| 6,296,570 B1 * | 10/2001 | Miyamoto et al. | 463/30 |
| 6,609,976 B1 * | 8/2003 | Yamagishi et al. | 463/31 |
| 6,852,028 B2 * | 2/2005 | Vancura | 463/16 |
| 7,594,847 B1 * | 9/2009 | York et al. | 463/5 |
| 2005/0020359 A1 * | 1/2005 | Ackley et al. | 463/31 |
| 2005/0091597 A1 * | 4/2005 | Ackley | 715/716 |
| 2006/0281547 A1 * | 12/2006 | Sogabe | 463/35 |
| 2007/0078706 A1 * | 4/2007 | Datta et al. | 705/14 |
| 2007/0079326 A1 * | 4/2007 | Datta et al. | 725/34 |
| 2007/0179867 A1 * | 8/2007 | Glazer et al. | 705/27 |
| 2007/0294089 A1 * | 12/2007 | Garbow et al. | 705/1 |
| 2008/0020837 A1 * | 1/2008 | Thomas et al. | 463/31 |

OTHER PUBLICATIONS

Joe_Dodson, "The Chronicles of Riddick: Escape from Butcher Bay Review," Dec. 23, 2004, available at: http://www.gamerevolution.com/review/the-chronicles-of-riddick-escape-from-butcher-bay, last accessed Sep. 3, 2013.*

* cited by examiner

*Primary Examiner* — Dmitry Suhol
*Assistant Examiner* — Jay Trent Liddle
(74) *Attorney, Agent, or Firm* — Frommer Lawrence & Haug LLP; Jamie L. Wiegand

(57) ABSTRACT

A method and system are directed towards providing interactive commentaries within a video game. The interactive commentaries are configured to increase a value of the video game by enhancing the video game with interactive rich commentaries regarding features and concepts of the video game and/or its construction. The interactive commentaries offer a variety of features that may, in one embodiment, take control of a player's view of the video game, and thereby more effectively communicate various aspects during the commentary. In one embodiment, a player may receive a video game reward for playing the interactive commentary.

20 Claims, 7 Drawing Sheets

ENHANCED COMMENTARY SYSTEM FOR 3D COMPUTER ENTERTAINMENT

CROSS-REFERENCE TO RELATED APPLICATIONS

This application claims the benefit of U.S. Provisional Application Ser. No. 60/807,446 entitled "Enhanced Commentary System for 3D Computer Entertainment," filed on Jul. 14, 2006, the benefit of the earlier filing date of which is hereby claimed under 35 U.S.C. §119(e) and which is further incorporated herein by reference.

TECHNICAL FIELD

The present invention relates to computer game systems, and in particular, but not exclusively, to a system and method for providing interactive commentaries within a video game, and more generally to a variety of interactive computer environments.

BACKGROUND

As many movie enthusiasts may be aware, the overall entertainment of a movie may be greatly enhanced when they become aware of the complexities involved in creating the movie. Therefore, many movie producers have created what is known as director's commentaries that often describe how the movie was made, various aspects of the plot, construction of a scene, or the like. Director's commentaries have even become a valuable feature of many DVD movie releases. Such commentaries typically consist of an audio track that may be played along with the underlying movie.

However, a video game involves a medium that is much more interactive than a DVD movie. Merely mapping of the concepts of director's commentaries as currently employed by many DVD movie releases into a video game ignores the advantage of the richness of information and features that are available to a video game producer. Thus, there is a desire to provide in-game commentaries that take advantage of the richness available to a video game producer and/or player. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
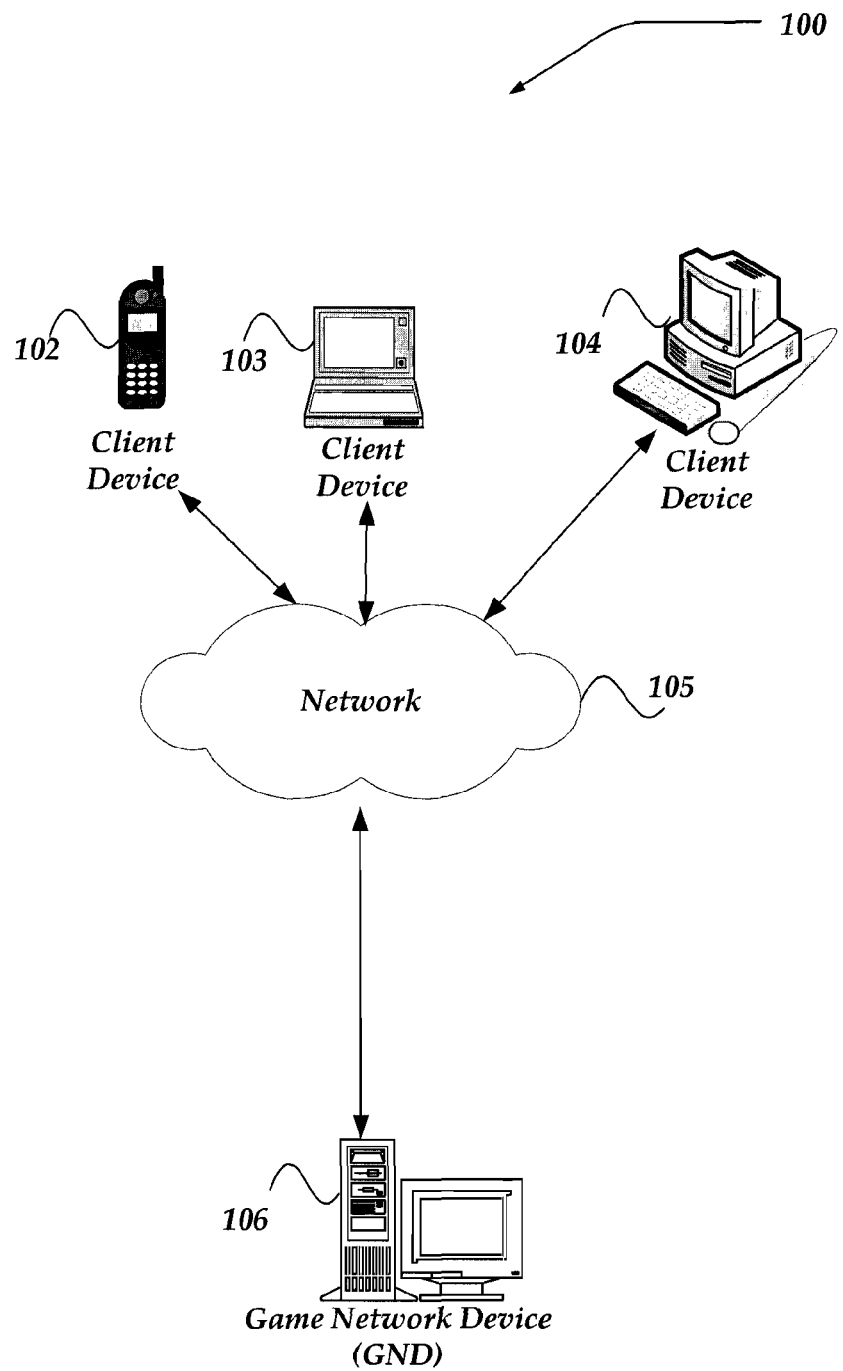
FIG. 1 illustrates one embodiment of an environment in which the invention may operate.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In this specification, the term "client" refers to a computer's general role as a requester of data or services, and the term "server" refers to a computer's general role as a provider of data or services. In general, it is possible that a computer can act as a client, requesting data or services in one transaction and act as a server, providing data or services in another transaction, thus changing its role from client to server or vice versa.

Briefly stated, the present invention is directed to a system, apparatus, and method for providing interactive commentaries within a video game that may be displayable on a video screen. The interactive commentaries are configured to increase a value of the video game by enhancing the video game with interactive rich commentaries associated with features and concepts of the video game, its characters, actors, and/or its construction. The interactive commentaries offer a variety of features that may, in one embodiment, take control of a player's view of the video game, and thereby more effectively communicate various aspects in the commentary.

In one embodiment, a player may receive a video game reward for playing the interactive commentary.

In one embodiment, a player may enable interactive commentaries that may be displayed as interactive commentary nodes. In one embodiment, an inactive interactive commentary node may rotate slowly about at least one axis. In addition, the game may provide hidden interactive commentary nodes that may be activated based on proximity of the player's avatar to the hidden interactive commentary node, a condition, an event, or the like.

In one embodiment, a hidden interactive commentary node may be revealed or displayed based on such actions, as the player firing a weapon into a defined volumetric area encompassing the hidden interactive commentary node, based on some condition and/or event within the game, or the like. For example, based on a defined number of game enemies killed, a defined time having elapsed since an earlier condition, or the like; or even the game detecting a new hardware component to a player's computing device; or the like.

In one embodiment, the displayed interactive commentary node may similarly become active based on any of the above events, conditions, or the like. The displayed interactive commentary node may also become active, for example, where a player touches the commentary node, selects a defined key on an input device, player's avatar 'looks' at the displayed interactive commentary node for some defined time period, the player's avatar shoots at the commentary node, or the like. Moreover, as stated above, the game may activate the displayed interactive commentary node based on detected conditions, and/or events, including a current state of the game, a number of enemies having been killed, a situation in which the player is in within a game scenario, a period of time having elapsed since some defined event, or the like. Clearly, the invention is not limited to these examples, however, and a displayed interactive commentary node may be displayed and/or activated based on any of a variety of events, conditions, actions, or the like, without departing from the scope of the invention.

When an interactive commentary node is activated, one or more commentary actions may be performed associated with a game feature, concept, or the like. Such commentary actions may include, but are not limited to taking control of a player's view, repositioning the player's viewing position, displaying an alternate view of a video game scene, modifying at least one gamestate variable, overlaying a video commentary, overlaying a video commentary using a virtual actor, selectively managing vulnerabilities of the player's avatar during a playing of the selected interactive commentary, pausing underlying gameplay, providing access to an interactive media browser for selecting additional commentary aspects, enabling the player to interact with a video game technology associated with creation of the video game, or preventing interruption of the playing of the interactive commentary until it is completed, each of which are described in more detail below.

Although the various embodiments discussed within are described in terms of a video game, the invention is not so limited, and may be employed with a variety of other interactive computing environments, including, but not limited to interactive computing programming environments, or the like.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client devices 102-104, network 105, and Game Network Device (GND) 106. Network 105 enables communication between client devices 102-104, and/or GND 106.

Generally, client devices 102-104 may include virtually any computing device capable of connecting to another computing device to send and receive information, including game information, and other interactive information. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device, and the like. Similarly, client devices 102-104 may be any device that is capable of connecting using a wired or wireless communication medium such as a PDA, POCKET PC, wearable computer, and any other device that is equipped to communicate over a wired and/or wireless communication medium.

Client devices 102-104 may further include a client application, and the like, that is configured to manage the actions described above.

Moreover, client devices 102-104 may also include a game client application, and the like, that is configured to enable an end-user to interact with and play a game, an interactive program, and the like. The game client may be configured to interact with a game server program, or the like. In one embodiment, the game client is configured to provide various functions, including, but not limited to, authentication, ability to enable an end-user to customize a game feature, synchronization with the game server program, activate, and play one or more interactive commentaries, or the like. In one embodiment, the game client and/or game server program may be configured to allow client devices 102-104 to play the game in a multi-player mode.

The game client may further enable game inputs, such as keyboard, mouse, audio, and the like. The game client may also perform some game related computations, including, but not limited to, audio, game logic, physics computations, visual rendering, and the like. In one embodiment, client devices 102-104 are configured to receive and store game related files, executables, audio files, graphic files, gamestate files, and the like, that may be employed by the game client, game server, and the like.

In one embodiment, the game server resides on another network device, such as GND 106. However, the invention is not so limited. For example, client devices 102-104 may also be configured to include the game server program, and the like, such that the game client and game server may interact on the same client device, or even another client device. Furthermore, although the present invention is described employing a client/server architecture, the invention is not so limited. Thus, other computing architectures may be employed, including but not limited to peer-to-peer, and the like.

Network 105 is configured to couple client devices 102-104, and the like, with each other, and to GND 106. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G), 4th (4G) generation radio access for cellular systems, Wireless-LAN, Wireless Router (WR) mesh, and the like. Access technologies such as 2G, 3G, 4G and future access networks may enable wide area coverage for mobile devices, such as client device 102 with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), Code Division Multiple Access 2000 (CDMA 2000) and the like.

Furthermore, remote computers and other related electronic devices could be remotely connected to either LANs or WANs via a modem and temporary telephone link. In essence, network 105 includes any communication method by which information may travel between client devices 102-104 and GND 106, and the like.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

One embodiment of GND 106 is described in more detail below in conjunction with FIG. 2. Briefly, however, GND 106 includes virtually any network device configured to include the game server program, and the like. As such, GND 106 may be implemented on a variety of computing devices including personal computers, desktop computers, multiprocessor systems, microprocessor-based devices, network PCs, servers, network appliances, and the like.

GND 106 may further provide secured communication for interactions and accounting information to speedup periodic update messages between the game client and the game server, and the like. Such update messages may include, but are not limited to a position update, velocity update, audio update, graphics update, authentication information, interactive commentary update, and the like.

Illustrative Server Environment

Figure 2:
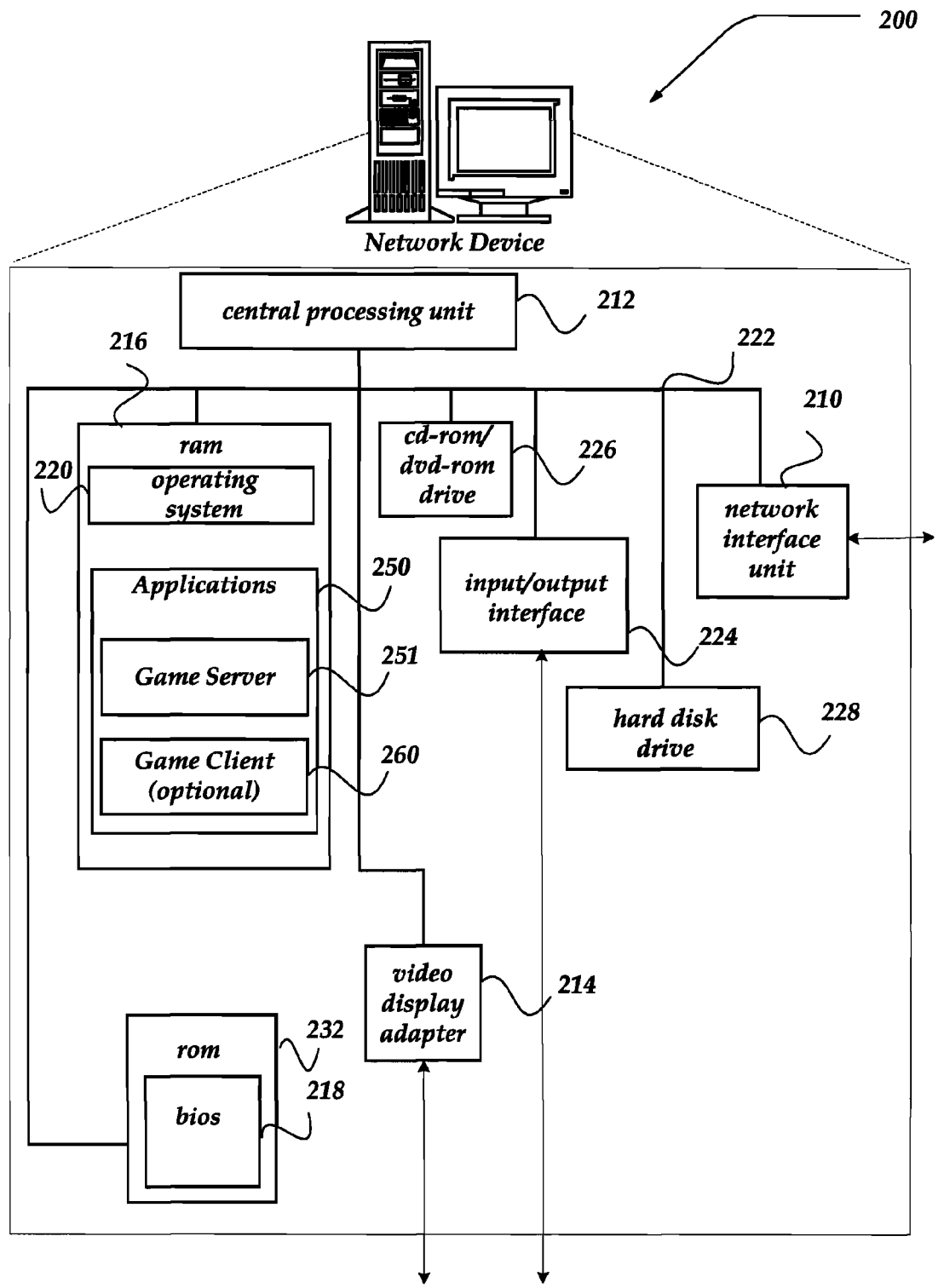
FIG. 2 shows a functional block diagram of one embodiment of a network device configured to operate with a game server.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, GND 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, such as network 105 in FIG. 1, via network interface unit 210, which is constructed for use with various communication protocols including the TCP/IP protocols. For example, in one embodiment, network interface unit 210 may employ a hybrid communication scheme using both TCP and IP multicast with a client device, such as client devices 102-104 of FIG. 1. Network interface unit 210 is sometimes known as a transceiver, network interface card (NIC), and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, graphics programs, database programs, word processing programs, HTTP programs, user interface programs, various security programs, and so forth. Mass storage may further include applications such as game server 251 and optional game client 260.

Figure 3:
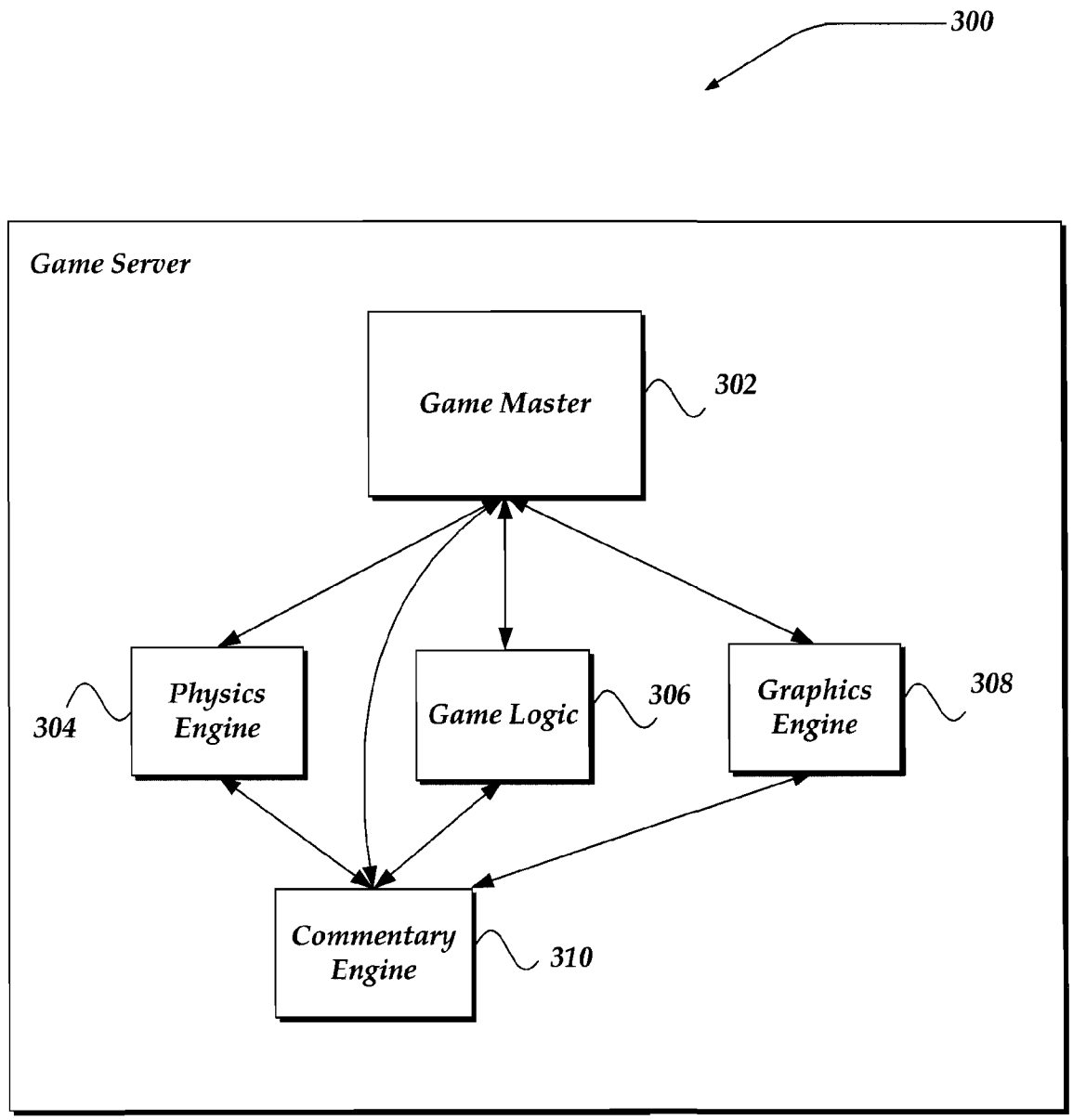
FIG. 3 illustrates a functional block diagram of one embodiment of the game server of FIG. 2.

One embodiment of game server 251 is described in more detail in conjunction with FIG. 3. Briefly, however, game server 251 is configured to enable an end-user to interact with a game, and similar three-dimensional modeling programs. In one embodiment, game server 251 interacts with a game client, similar to game client 260, residing on a client device, such as client devices 102-105 of FIG. 1 and/or optional game client 260 residing on network device 200. Game server 251 may also interact with other components residing on the client device, another network device, and the like. For example, game server 251 may interact with a client application, security application, transport application, and the like, on another device.

Network device 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 200 may further include applications that support virtually any secure connection, including but not limited to TLS, TTLS, EAP, SSL, IPSec, and the like.

Network device 200 also includes input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, client device information, policy, security information including, but not limited to certificates, ciphers, passwords, and the like.

FIG. 3 illustrates a functional block diagram of one embodiment of a game server for use in GND 106 of FIG. 1. As such, game server 300 may represent, for example, game server 251 of FIG. 2. Game server 300 may include many more components than those shown. The components shown, however, are sufficient to disclose an illustrative embodiment for practicing the invention. It is further noted that virtually any distribution of functions may be employed across and between a game client and game server. Moreover, the present invention is not limited to any particular architecture, and another may be employed. However, for ease of illustration of the invention, a client/server architecture has been selected for discussion below. Thus, as shown in the figure, game server 300 includes game master 302, physics engine 304, game logic 306, and graphics engine 308 and commentary engine 310.

Game master 302 may also be configured to provide authentication, and communication services with a game client, another game server, and the like. Game master 302 may receive, for example, input events from the game client, such as keys, mouse movements, and the like, and provide the input events to game logic 306, physics engine 304, graphics engine 308, commentary engine 310, and the like. Game master 302 may further communicate with several game clients to enable multiple players, and the like. Game master 302 may also monitor actions associated with a game client, client device, another game server, and the like, to determine if the action is authorized. Game master 302 may also disable an input from an unauthorized sender.

Game master 302 may further manage interactions between physics engine 304, game logic 306, graphics engine 308, and commentary engine 310. In one embodiment, game server 300 may employ a process substantially similar to that described below in conjunction with FIG. 6 to perform at least some of its actions.

Game logic 306 is also in communication with game master 302, and is configured to provide game rules, goals, and the like. Game logic 306 may include a definition of a game logic entity within the game, such as an avatar, vehicle, and the like. Game logic 306 may include rules, goals, and the like, associated with how the game logic entity may move, interact, appear, and the like, as well. Game logic 306 may further include information about the environment, and the like, in which the game logic entity may interact. Game logic 306 may also include a component associated with artificial intelligence, neural networks, and the like.

Physics engine 304 is in communication with game master 302. Physics engine 304 is configured to provide mathematical computations for interactions, movements, forces, torques, collision detections, collisions, and the like. In one embodiment, physics engine 304 is provided by a third party. However, the invention is not so limited and virtually any physics engine 304 may be employed that is configured to determine properties of entities, and a relationship between the entities and environments related to the laws of physics as abstracted for a virtual environment.

Physics engine 304 may determine the interactions, movements, forces, torques, collisions, and the like for a physics proxy. Virtually every game logic entity may have associated with it, a physics proxy. The physics proxy may be substantially similar to the game logic entity, including, but not limited to shape. In one embodiment, however, the physics proxy is reduced in size from the game logic entity by an amount epsilon. The epsilon may be virtually any value, including, but not limited to a value substantially equal to a distance the game logic entity may be able to move during one computational frame.

Graphics engine 308 is in communication with game master 302 and is configured to determine and provide graphical information associated with the overall game. As such, graphics engine 308 may include a bump-mapping component for determining and rending surfaces having high-density surface detail. Graphics engine 308 may also include a polygon component for rendering three-dimensional objects, an ambient light component for rendering ambient light effects, and the like. Graphics engine 308 may further include an animation component, an eye-glint component, and the like. However, graphics engine 308 is not limited to these components, and others may be included, without departing from the scope or spirit of the invention. For example, additional components may exist that are employable for managing and storing such information, as map files, entity data files, environment data files, color palette files, texture files, and the like.

Commentary engine 310 is in communication with game master 302, physics engine 304, game logic 306, and graphic engine 308. Commentary engine 310 is configured to manage display and activation of interactive commentary nodes to enhance a value of the video game by enabling illustration, discussions, and the like, regarding various features, concepts and aspects of the video game. In one embodiment, commentary engine 310 may interact with various other components of game master 302 to enable playing of an interactive commentary. For example, in one embodiment, commentary engine 310 may interact with game logic 306 to modify at least one gamestate variable during an interactive commentary play. In another embodiment, commentary engine 310 may interact with physics engine 304 and/or graphics engine 308 to illustrate alternate views of a scene, take over control of a camera view to, for example, direct a player's attention to a particular aspect of the game, or the like. Commentary engine 310 may also manage game rewards that may be provided to the player based on playing of an interactive commentary. Such game rewards may be used within the game, modify an action or rule within game logic 306, or even be used to obtain gifts, discounts, merchandise, or the like.

In one embodiment, commentary engine 310 may be configured to save information associated with interactive commentaries, including but not limited to a number of interactive commentary nodes activated by the player, a condition associated with making a hidden interactive commentary nodes visible, or the like. Commentary engine 310 may also be configured to enable a player to activate and interact with an interactive commentary, while other players in a multi-player game might not view or be able to interact with the interactive commentary. In one embodiment, commentary engine 310 may make the player's avatar invulnerable to at least some damage from the game, and/or other players while the interactive commentary is active. Commentary engine 310 may perform at least some of its actions using at least some of processes substantially similar to processes 600 and 700 described below in conjunction with FIGS. 6-7.

In another embodiment, a game client 260 of FIG. 2 can be employed to assist with or solely perform single or combinatorial actions associated with game server 300, including those actions associated with game master 302, commentary engine 310, graphics engine 308, game logic 306, and physics engine 304. In one embodiment, game client 260 may reside within a client device and interact with game server 300, or reside within network device 200 to enable a client device to communicate with game server 300 through game client 260.

Illustrative Screenshots

Figure 4:
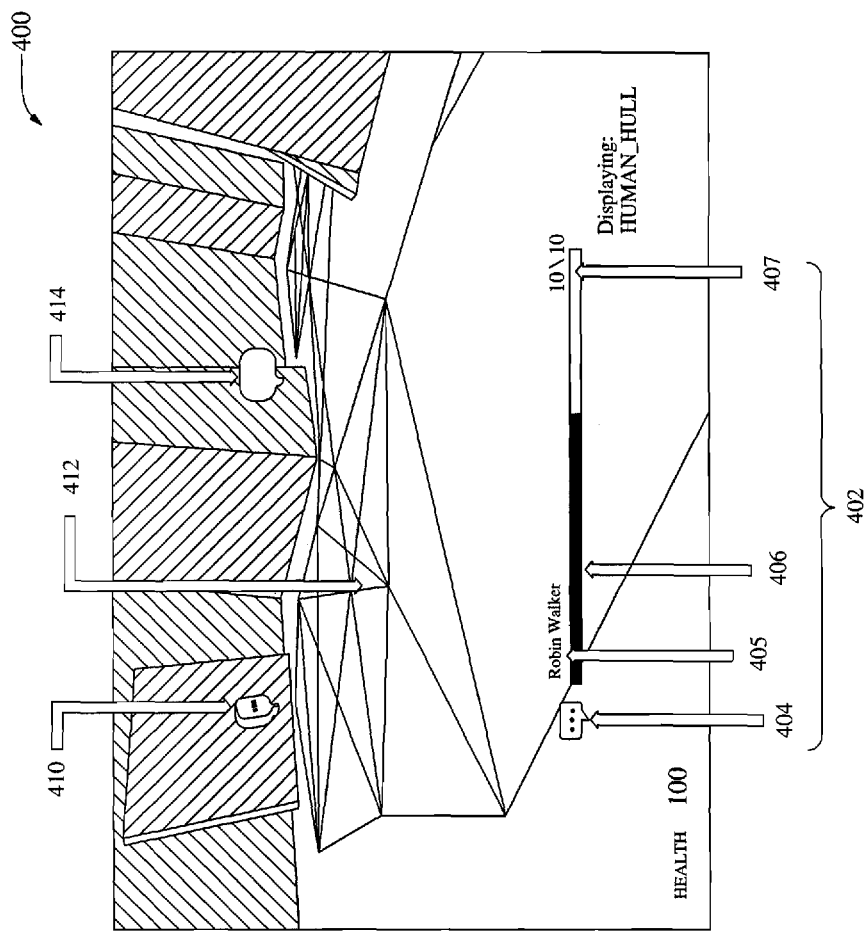
FIG. 4 shows a game screen shot of one embodiment of an activated interactive commentary node displaying associated commentary information.
Figure 5:
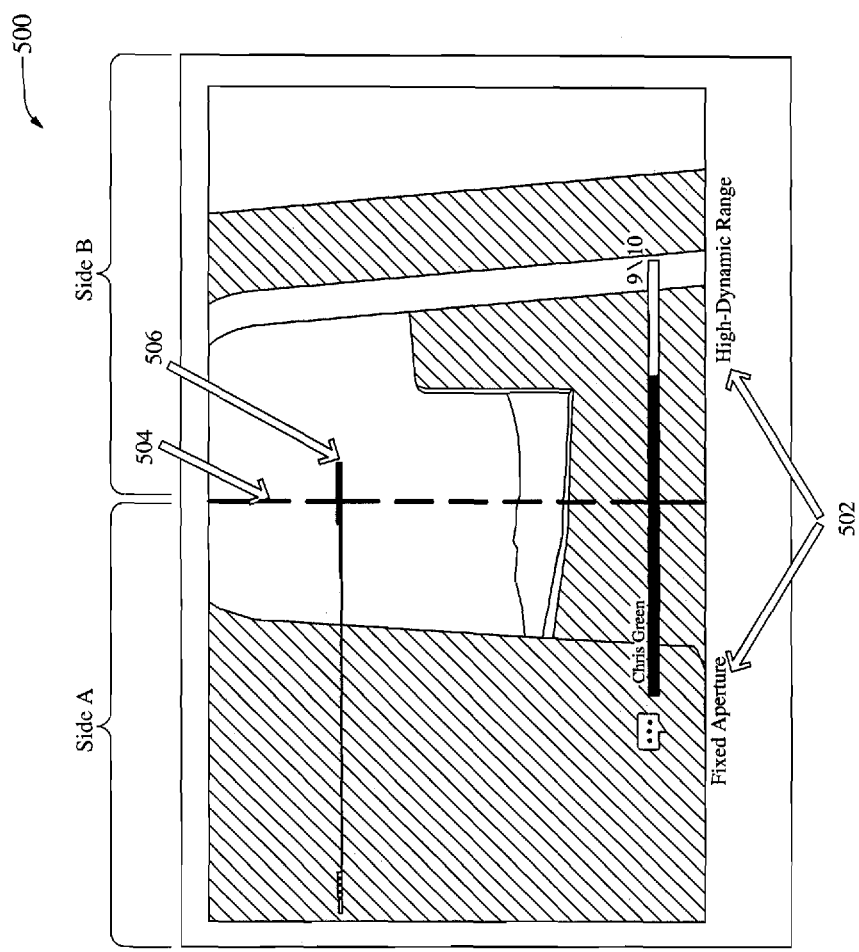
FIG. 5 shows another game screen shot of one embodiment of an activated interactive commentary node illustrating alternate views of a scene using a split screen mode.

FIGS. 4-5 illustrate various game screen shots that are employed to show selected aspects of interactive commentaries. The game screen shots are not intended to be limiting, but are used merely to provide an example context in which the interactive commentaries may be employed. Thus, it should be clear that interactive commentaries may be displayed or hidden within any of a variety of other game actions, displays or the like, without departing from the scope of the invention.

FIG. 4 shows a game screen shot of one embodiment of an activated interactive commentary node displaying associated commentary information. Screen shot 400 may include many more components than those shown. The components shown, however, are sufficient to disclose an illustrative embodiment for practicing the invention.

Shown in screen shot 400 is an interactive commentary node 410, and presently inactive interactive commentary node 414. Although shown are two interactive commentary nodes (410 and 414), a game display may include more or less interactive commentary nodes. As shown, interactive commentary nodes 410 and 414 may be configured to rotate about at least one of its axes at a first speed. The first speed may, in one embodiment, be a slow rotation, such as about 0.25 to about one rotation per second, or the like. In another embodiment, interactive commentary nodes 410 and/or 414 may remain stationary until an event, condition, or the like, is satisfied. For example, when a player redirects an avatar's attention towards an interactive commentary node it may rotate; otherwise, it might be non-rotating. However, other actions, events, states, or the like, may also change how an interactive commentary node is displayed. Thus, an interactive commentary node may change based on a player firing a weapon into a defined volumetric area encompassing the interactive commentary node; or based on a defined number of game enemies killed; based on a defined time having elapsed since an earlier condition; or even based on the game server detecting a new hardware component to a player's computing device; or the like. Clearly, however, the invention is not so limited to these examples, and virtually any state, condition, event, or the like, may be used to vary how and/or when an interactive commentary node is displayed.

As shown, the interactive commentary nodes 410 and 414 are illustrated as typical 'speaking bubbles.' However, the invention is not constrained to this icon for illustrating an interactive commentary node. For example, interactive commentary nodes 410 and/or 414 may also be illustrated using a rectangle, a star, an avatar, a circle, or any of a variety of other mechanisms.

Interactive commentary nodes 410 and 414 may, in one embodiment, be attached to an object, such as a table, car, train, avatar, creature, weapon, or the like, such that when the object moves within a game, the interactive commentary node moves with the object. In another embodiment, an interactive commentary node may be associated with a non-moving object such as a mountain, lake, building, or the like. In yet another embodiment, an interactive commentary node may be visibly 'floating' unattached to an object within a game scene. For example, in one embodiment, an unattached interactive commentary node may be associated with a concept or aspect of the game scene itself rather than an object per se. For example, the unattached interactive commentary may be employed to provide a commentary associated with that concept or aspect.

When an interactive commentary node is activated, in one embodiment, the interactive commentary node may rotate about at least one of its axes at a second speed. In one embodiment, the second speed is faster than the first speed, such as about double the first speed. However, the invention is not so limited. For example, when activated, the interactive commentary node may change color, size, shape, transparency, or the like. In one embodiment, the non-activated interactive commentary nodes that are visible within the same game scene, such as inactive interactive commentary node 414 may also change, when another interactive commentary node is activated. Thus, for example, inactive interactive commentary node 414 may change color, size, rate of rotation, shape, transparency, or the like.

In addition, when an interactive commentary node is activated, commentary information 402 may be displayed. As shown, commentary information 402 includes bubble 404, commentator name 405, progress indicator 406, and node counter 407. In one embodiment, bubble 404 indicates that the information is associated with an interactive commentary node. However, an interactive commentary node may include less or more information than described for commentary information 402. Therefore, such information is intended to merely illustrate one embodiment, and is not intended to be exhaustive, or otherwise limiting.

Progress indicator 406 is configured to provide a player with an indication of how much of the active interactive commentary is completed, and how much is yet to be completed. In one embodiment, progress indicator 406 employs a bar that is 'filled' to show the amount of the active interactive commentary that is complete. However, progress indicator 406 may also employ a thermometer, a dial, or virtually any other icon to represent progress of the active interactive commentary.

Node counter 407 may illustrate which interactive commentary node is currently active and how many interactive commentaries are available to be activated based on a current game scene, current game, or the like. In one embodiment, node counter 407 may also indicate a number of interactive commentaries that the player has activated and/or a total of interactive commentaries available to the player. In one embodiment, based on a condition, proximity of a player's avatar to a hidden interactive commentary, a game rule, or the like, the total number of interactive commentaries may vary.

Although not illustrated, interactive commentary nodes may be hidden within a game scene. Then, based on a condition, rule, event, proximity to the hidden interactive commentary node, or the like, the interactive commentary node may be automatically activated, or made visible to the player such that the player may activate the interactive commentary node. For example, a hidden interactive commentary node may become visible after the player performs some action, such as leaving and re-entering a room, touching an object, damaging a character in the game, or a time period having elapsed, or the like, or any of the above mentioned non-exhaustive examples.

Also illustrated is navigation web 412. Navigation web 412 represents one feature that may be illustrated during an interactive commentary. As shown, navigation web 412 may represent various paths or routes in which an object may traverse during a game play. As such, navigation web 412 may be displayed during an interactive commentary to explain how a computation may be performed to move an object during a game, a constraint in an object's movement, or the like. However, navigation web 412 may also be employed to illustrate other features, concepts, or the like, of the game.

FIG. 5 shows another game screen shot of one embodiment of an activated interactive commentary node illustrating alternate views of a scene using a split screen mode. Screen shot 500 may include many more components than those shown. The components shown, however, are sufficient to disclose an illustrative embodiment for practicing the invention.

Screen shot 500 illustrates a split screen 504 wherein one side of the screen (side A) illustrates an alternate view of a scene than the other side of the screen (side B). As shown, screen shot 500 shows how use of a fixed aperture versus a high-dynamic range filter 502 might show a scene. As such, as the player traverses the scene, various objects may be viewed within one of the sides of the split screen 504. Thus, the player may dynamically move and compare the differences as the interactive commentary proceeds to explain the differences. By enabling the player to move and interact with the game while an interactive commentary is active, the player may better experience and appreciate the concepts, aspects, features, or the like, of the game and/or the game's construction. In addition, various other icons, displays, avatars, actors, and the like, may be provided during an active interactive commentary to explain what is being illustrated. For example, as shown spectral density bar 506 may be shown to illustrate how a light intensity may vary based on use of a fixed aperture versus a high-dynamic range filter.

Illustrative Flowcharts

Figure 6:
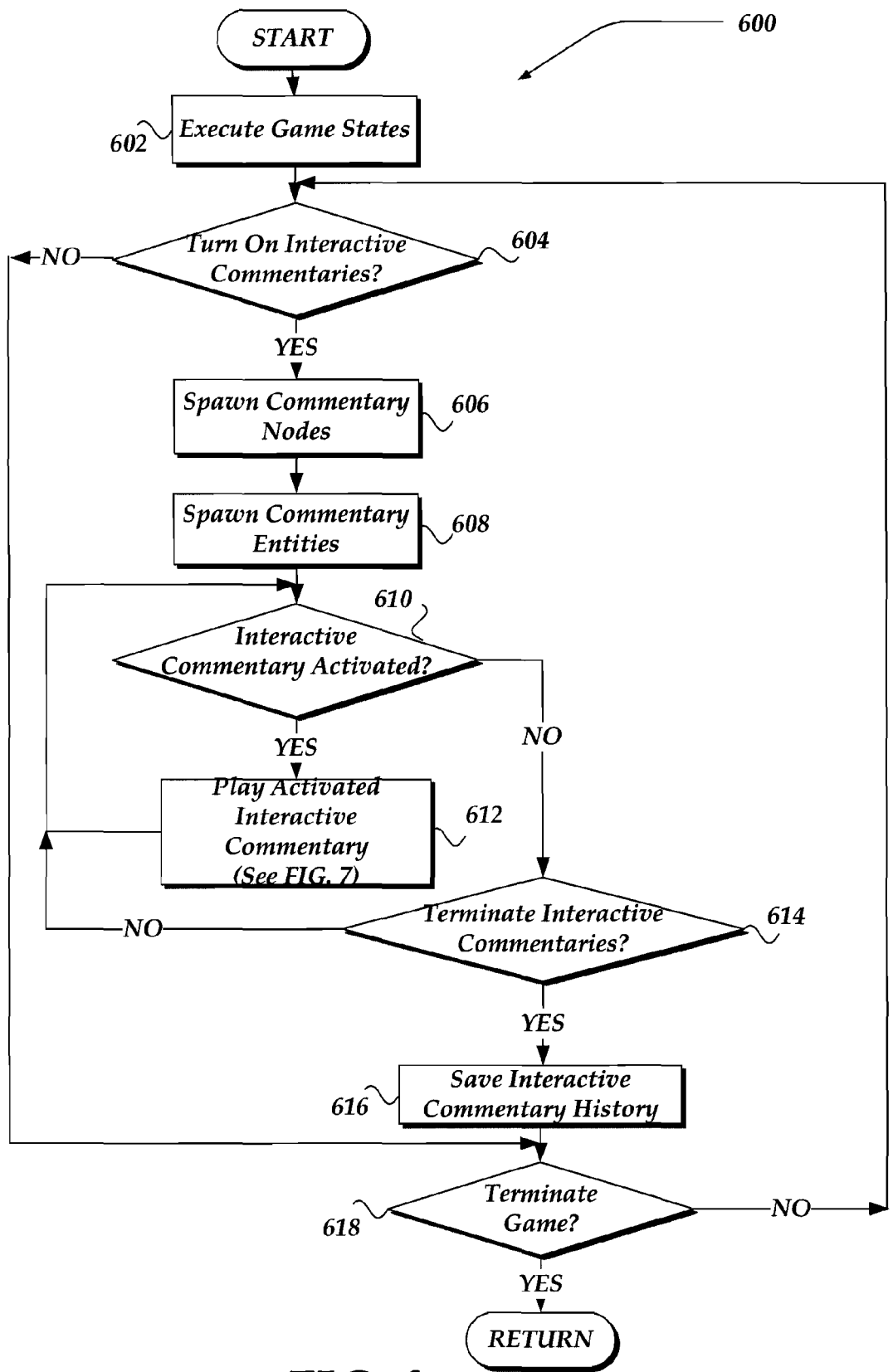
FIG. 6 shows a flow diagram generally showing one embodiment of a process for managing interactive commentaries within a video game.

The operation of certain aspects of the invention will now be described with respect to FIGS. 6-7. FIG. 6 shows a flow diagram generally showing one embodiment of a process for managing interactive commentaries within a video game. In one embodiment, process 600 of FIG. 6 may be performed within game server 300 of FIG. 3.

Process 600 begins, after a start block, at block 602 when a game is executed. During execution, one or more players may interact with the game, other players, objects within the game, and the like, to change various game states.

Process 600 continues to decision block 604, where a player may select to turn on interactive commentary mode. Turning on interactive commentary mode may be performed using any of a variety of mechanisms, including but not limited to selecting an option within an option menu, performing a defined keystroke sequence, or the like. In one embodiment, interactive commentary mode may be turned on automatically by the game based on a default configuration, a condition during the game, an event within the execution of the game, or the like. In any event, if interactive commentary mode is turned on, process 600 flows to block 606; otherwise, processing branches to decision block 618.

At block 606, interactive commentary nodes are spawned, or generated. In one embodiment, where a scene includes interactive commentary nodes, they may be displayed, or otherwise situated when the interactive commentary node is hidden. When a condition, event, or proximity to a hidden interactive commentary node is satisfied, a hidden interactive commentary node may become visible to the player.

In one embodiment, a hidden interactive commentary node may be revealed or displayed based on such actions, as the player firing a weapon into a defined volumetric area encompassing the hidden interactive commentary node, based on some condition and/or event within the game, or the like. For example, based on a defined number of game enemies killed, a defined time having elapsed since an earlier condition, or the like; or even the game detecting a new hardware component to a player's computing device; or the like. However, the invention is not limited to these examples, and an interactive commentary node may become visible for a variety of other reasons. For example, an interactive commentary node may become visible based on another interactive commentary node being displayed, being played, becoming hidden, or the like.

Processing continues next to block 608, where interactive commentary entities may be spawned, or otherwise generated for use during the game. Such interactive commentary entities, may include generating a speaking avatar, a navigation web, or other objects, or the like, that may be employed during execution of an interactive commentary node. In one embodiment, such interactive commentary entities, however, may not be visible until a particular interactive commentary node is activated.

Continuing, process 600 flows next to decision block 610, where a determination is made whether an interactive commentary node is activated. Activation may be performed by a player, or automatically based, in part, on an event, condition, proximity to an interactive commentary node, or the like. In one embodiment, the player may select to activate an interactive commentary node using a keyboard entry, a mouse click, a pointer, text entry, or the like. In one embodiment, an interactive commentary node may similarly become active based on whether a player touches the commentary node, the player's avatar 'looks' at the displayed interactive commentary node for some defined time period, the player's avatar shoots at the commentary node, or the like. Moreover, as stated above, the interactive commentary node may also become active based on a current state of the game, a number of enemies having been killed, a situation in which the player is in within a game scenario, a period of time having elapsed since some defined event, or the like. Clearly, however, the invention is not limited to these examples, and an interactive commentary node may be activated based on any of a variety of events, conditions, actions, or the like, without departing from the scope of the invention. In any event, if an interactive commentary node is determined to be activated, process flows to block 612; otherwise, process branches to decision block 614.

Block 612 is described in more detail below in conjunction with FIG. 7. Briefly, however, at block 612, the activated interactive commentary node is executed and performs at least one commentary action associated with a game feature, concept, or other aspect, of the game. During block 612, in one embodiment, an activated interactive commentary node may perform several interactive commentary actions. In one embodiment, activation of an interactive commentary node may also automatically activate another interactive commentary node and/or action. In any event, upon completion of block 612, process loops back to decision block 610 to determine whether another interactive commentary node is activated.

At decision block 614, however, a determination is made whether interactive commentary mode is to be terminated (turned off). In one embodiment, the player may select to turn off interactive commentary mode using any of a variety of mechanisms, including those mentioned above for turning on interactive commentary mode. If it is determined that interactive commentary mode is to be terminated, then process continues to block 616; otherwise, processing loops back to decision block 610, to continue as described above.

At block 616, in one embodiment, a history of status of interactive commentaries may be saved for the player. In one embodiment, such history may include, but is not limited to, information associated with any rewards obtained, a number of interactive commentaries completed, a number of interactive commentaries to be completed, a game state, or the like. Processing then flows to decision block 618 where a determination is made whether the game is to be terminated. If the game is to be terminated, process 600 may return to a calling process to perform other actions, including enabling the player to save a game state, or the like. Otherwise, if the game is not to be terminated, process 600 may loop back to decision block 604 to perform actions as described above.

Figure 7:
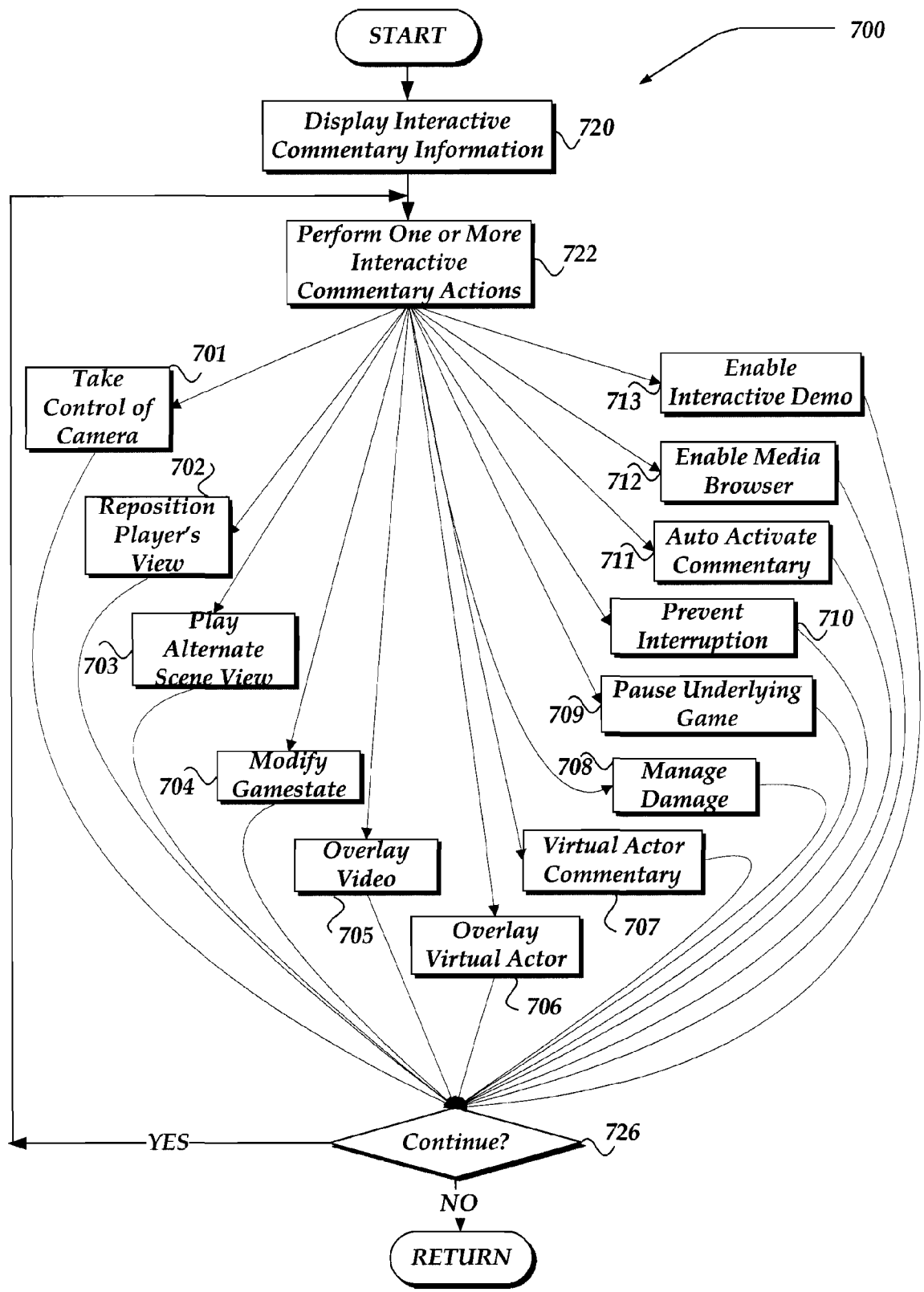
FIG. 7 shows a flow diagram generally showing one embodiment of a process for managing various commentary actions associated with a game, in accordance with the invention.

FIG. 7 shows a flow diagram generally showing one embodiment of a process for managing various interactive commentary actions associated with a game. Process 700 of FIG. 7 may be implemented within commentary engine 310 of FIG. 3, for example. Moreover, process 700 may represent one embodiment of block 612 of process 600, described above in conjunction with FIG. 6.

As shown, process 700 begins at block 720, where information associated with the active interactive commentary node is displayed. Such information may include, for example, a progress indicator, commentary node counter, or the like, as described above.

Process 700 next flows to block 722 where one or more interactive commentary actions are selected to be performed. As shown, the flow of process 700 may be to any of blocks 701-713, inclusive.

Thus, if the flow is to block 701, then control of a camera view, or view of the player is taken over by the interactive commentary. That is, rather than just playing an audio file and letting the player look anywhere in the game, possibly missing some aspect being discussed in the interactive commentary, block 701 provides the ability to lock the camera onto some aspect in the game, thus taking control of the camera view. For example, if the interactive commentary is discussing a doorway, then the "player's eyes" can be locked to look at the doorway. In one embodiment, this can be done by manipulating the camera from which the scene is viewed. In another embodiment, this may be performed by manipulating a user input to force the player to act as if was steering its eyes in the desired direction. Moreover, controlling the camera view may also include zooming of the player's view in towards a particular aspect of the game or object, changing an angle of the player's view, changing a perspective of the player's view, or the like.

Process 700 then flows to decision block 726, where a determination is made whether to continue performing one or more interactive commentary actions. In one embodiment, performing of an interactive commentary action may result in launching of another interactive commentary action. The launching of the other interactive commentary action may occur anywhere within or even at the start and/or completion of the currently active interactive commentary action. Thus, if another interactive commentary action is to be performed, processing loops back to 722; otherwise, process 700 returns to a calling process to perform other actions.

If the flow is to block 702, then the player may be moved into a determined viewing position. Similarly, if there is a determined particularly good vantage point from which to hear a certain commentary, block 702 provides a mechanism for moving the camera into that position. For example, if the commentary is directed toward some large vista in the game scene, but the player activating the interactive commentary node is not in the appropriate position, then the player's camera (or an object) can be procedurally moved to the vantage point. In another example, the player may be repositioned to one side of a building or wall to observe an action from one perspective, and then repositioned to another side, or other scene to observe how the action is performed, or to view the action from another perspective. The motion can be instantaneous (teleported), smoothly interpolated, interpolated along a curve in the spatial or time dimension, or using virtually any other camera motion technique.

Process 700 then flows to decision block 726, where a determination is made whether to continue performing one or more interactive commentary actions. If so, process 700 loops back to block 722; otherwise, processing returns to the calling process.

If the flow is to block 703, then the player may be provided with alternate views of the scene. At block 703, what the player is viewing may be controlled, while the player listens to the commentary. For instance, if a particular rendering feature is being discussed, a rendering of the screen twice, or in a split-screen mode, or the like, may be provided where a portion of the screen shows a rendering of the scene in one configuration, while another portion of the screen illustrates the scene rendered in another configuration. Thus, for example, a before and an after scene may be provided using, such as the split screen mode. Such before/after mode may illustrate, for example, application of different game creation techniques, such as described above in conjunction with FIG. 5.

In one embodiment, additional objects, game characters, or the like, may be displayed during playing of the interactive commentary to further illustrate an aspect associated with the interactive commentary. In one embodiment, the objects may be used to provide multiple actions under alternate views. For example, alternate views may be displayed showing different aspects of a fight scene, a train wreck, or the like, under different lighting, speeds, perspectives, or the like. Moreover, such alternate views may be shown in split-screen, in a sequence of alternate scenes, or in any of a variety of alternate viewing ways. In one embodiment, the additional objects may then be removed from the game scene upon completion of the interactive commentary.

Process 700 then flows to decision block 726, where a determination is made whether to continue performing one or more interactive commentary actions. If so, process 700 loops back to block 722; otherwise, processing returns to the calling process.

If the flow is to block 704, then a gamestate may be modified during playing of the interactive commentary. In another embodiment, various game variables may be modified during playing of the interactive commentary. These changes can be triggered at the same time or delayed from the commencement of the interactive commentary. The changes may be implemented by any of a number of possible mechanisms, including manipulation of script variables by data associated with the interactive commentary node to the triggering of executable code in the game engine, or the like. Such gamestate variables may affect, any of a variety of aspects of the game, including, zooming a view, turning on/off various visual modes, such as displaying a navigation web, or the like. The gamestate variables may also pause or freeze an action of selective objects within the game, to enable the player to navigate around an object, otherwise, move within the game during the interactive commentary. Process 700 then flows to decision block 726, where a determination is made whether to continue performing one or more interactive commentary actions. If so, process 700 loops back to block 722; otherwise, processing returns to the calling process.

If the flow is to block 705, then video commentary may be overlaid onto a game scene. In one embodiment, non-audio commentary may be overlaid onto the screen. For instance, an inset view of a person, avatar, or the like, can be shown in addition to hearing an audio commentary. The video can be locally streamed or streamed from a remote server using any of variety of streaming mechanisms. Process 700 then flows to decision block 726, where a determination is made whether to continue performing one or more interactive commentary actions. If so, process 700 loops back to block 722; otherwise, processing returns to the calling process.

If the flow is to block 706, then a display of a virtual actor may be overlaid onto a game scene. That is, the commentary may be emitted from a virtual actor positioned onto the screen. In one embodiment, the virtual actor is positioned on a screen in the actual game, such as a "kiosk" or video monitor. However, the invention is not so limited, and the virtual actor may be overlaid onto the game scene using any of a variety of other mechanisms, without departing from the scope of the invention. Process 700 then flows to decision block 726, where a determination is made whether to continue performing one or more interactive commentary actions. If so, process 700 loops back to block 722; otherwise, processing returns to the calling process.

If the flow is to block 707, then a virtual actor is configured to provide the interactive commentary. In one embodiment, the virtual actor provides the audio commentary directly. In this mode, an actor may use facial animation technology to move the mouth of the actor during the commentary playback. Similarly, the virtual actor can be made to gesture and otherwise indicate points of interest being discussed in the commentary. In another embodiment, the virtual actor may appear within the game scene and may further be enabled to move around within the game scene during the interactive commentary. In one embodiment, the virtual actor may be configured to point out, touch, or otherwise interact with the game scene during the interactive commentary. In one embodiment the actor providing the commentary is one of the characters in the game. In another embodiment, the actor is specially created for delivering the commentary. Process 700 then flows to decision block 726, where a determination is made whether to continue performing one or more interactive commentary actions. If so, process 700 loops back to block 722; otherwise, processing returns to the calling process.

If the flow is to block 708, then during the playing of the interactive commentary, block 708 may perform actions that selectively prevent harm or damage to the player or game actor. During play of commentary it may be undesirable that the player or certain game actors remain vulnerable to some or all types of damage. For example, it may be undesirable to have the player be shot, or otherwise injured by another player, a character, or the like, in the game. Thus, block 708 performs actions including monitoring and making the player activating the commentary node invincible or less susceptible to damage during the interactive commentary. Similarly, other game actors to the game could also be made less susceptible to damage. In one embodiment, however, selective harm may still occur to the player. For example, if the player attempts to move through water, or a building, or traverse fire, the player's avatar may still be harmed. By enabling at least some harm to still occur, the player is prevented from 'cheating' on the game, during playing of an interactive commentary. Process 700 then flows to decision block 726, where a determination is made whether to continue performing one or more interactive commentary actions. If so, process 700 loops back to block 722; otherwise, processing returns to the calling process.

If the flow is to block 709, then at least a portion of the underlying gameplay may be paused. In one embodiment, the underlying gameplay may also be slowed down in time, rather than paused or frozen. In another embodiment, a portion of the underlying gameplay may be paused, while another portion is allowed to continue to execute. Because the commentary may be part of an active gaming session, it is sometimes desirable to so modify an action during a lengthy commentary play. This is directed, at least in part, towards making it less likely that the player is damaged or suffers game-related death during the interactive commentary.

Process 700 then flows to decision block 726, where a determination is made whether to continue performing one or more interactive commentary actions. If so, process 700 loops back to block 722; otherwise, processing returns to the calling process.

If the flow is to block 710, then a determined interactive commentary may be configured to be unstoppable once it begins. Determined commentary information can be played in such a way that the player cannot interrupt the playback until the interactive commentary node has finished playing completely. In one embodiment, whether the interactive commentary node is interruptible can be toggled based on a game state, including, but limited to, being interruptible only after playback has gotten a certain portion of the way through the commentary for the interactive commentary node, or the like. For example, it may be reasonable to prevent interruption of an interactive commentary node that is configured to provide the player with instructions on how interactive commentaries are employed within the game. Process 700 then flows to decision block 726, where a determination is made whether to continue performing one or more interactive commentary actions. If so, process 700 loops back to block 722; otherwise, processing returns to the calling process.

If the flow is to block 711, as described above, selective interactive commentary nodes may be automatically activated based on a variety of conditions, events, or the like. For example, there may arise within the execution of the game, a situation where the player is unable to perform an action. In such situations, it may be desirable to have a selected interactive commentary node be automatically activated. For example, when the player satisfies some condition, the game reaches a particular event within the game, or the like, the interactive commentary node may be automatically activated. In another embodiment, at block 711, a previously hidden interactive commentary node may become visible based on some condition, event, proximity to the hidden interactive commentary node, or the like. In one embodiment, the hidden interactive commentary node may also be automatically activated based on any of the above. In any event, such activation may be in addition to, or distinct from activation of another interactive commentary node. Process 700 then flows to decision block 726, where a determination is made whether to continue performing one or more interactive commentary actions. If so, process 700 loops back to block 722; otherwise, processing returns to the calling process.

If the flow is to block 712, then a media window may be displayed during activation of an interactive commentary node. Use of the media window may enable the player to select and view various media clips, files, or the like, associated with the active interactive commentary node. For example, the player may select various concept art, design discussions, a maquette of an object, or the like, that the player may then manipulate, including selecting, turning, zooming on, or otherwise examining during the playing of the interactive commentary. In one embodiment, the media window may also include links to a website, or the like, to view additional information, while playing the interactive commentary. In any event, process 700 then flows to decision block 726, where a determination is made whether to continue performing one or more interactive commentary actions. If so, process 700 loops back to block 722; otherwise, processing returns to the calling process.

If the flow is to block 713, then an interactive demonstration may be provided during block 713 that enables the player to perform various actions. For example, in one embodiment, the game may pause, to enable the player to move around within the game scene during the playing of the interactive commentary. In another embodiment, the player may be provided with a demonstration that illustrates various game technologies that the player may then manipulate. For example, the demonstration may provide a facial animation, object or the like, that allows the player to modify the face, modify a light source in relation to the face or other object, toggle on/off various other visual effects, or the like, during the interactive commentary. Process 700 then flows to decision block 726, where a determination is made whether to continue performing one or more interactive commentary actions. If so, process 700 loops back to block 722; otherwise, processing returns to the calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause operational steps to be performed by the processor to produce a computer implemented process such that the instructions, which execute on the processor to provide steps for implementing the actions specified in the flowchart block or blocks. In one embodiment, at least some of the operational steps may be performed serially; however, the invention is not so limited, and at least some steps may be performed concurrently.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Moreover, although the various embodiments discussed above are described in terms of a video game, the invention is not so limited, and may be employed with a variety of other interactive computing environments. Thus, for example, the various embodiments may also be employed to provide interactive commentaries within a computer-executable movie, a computer-executable music video, an educational presentation, commercial, or other media executed on a computing device.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for providing commentaries within a video game that is played on a client device, comprising:
    enabling a player of the video game on the client device to display at least one interactive commentary node, the video game being a multi-player game;
    activating at least one of the interactive commentary nodes, wherein the activation may be either automatic or initiated by the player, and wherein the activation displays interactive commentary information;
    in response to the activation of the at least one interactive commentary nodes, playing the at least one activated interactive commentary associated with the interactive commentary node and displaying a feature of video game creation techniques; and
    while the at least one activated commentary is playing, selectively preventing harm to an avatar of the player by at least another player, while allowing the avatar of the player to be harmed to prevent cheating by the player, and, further inhibiting display of the at least one activated interactive commentary to another player.

2. The method of claim 1, wherein performing at least one commentary action further comprises performing at least one of the following: repositioning the player's viewing position, overlaying a video commentary onto the video game, or enabling the player to interact with a video game technology associated with creation of the video game.

3. The method of claim 1, wherein at least one interactive commentary node is configured to change at least one of a shape, orientation, or color, when activated.

4. The method of claim 1, wherein enabling a player to display at least one interactive commentary node, further comprises:
    providing at least one hidden interactive commentary node that is configured to become visible based on at least one of a proximity relationship of the avatar associated with the player to the least one hidden interactive commentary node, based on the player having the avatar look towards an area of a video game display having the hidden interactive commentary node, or based on the player shooting a weapon towards an area within a video game display having the hidden interactive commentary node.

5. The method of claim 1, wherein the interactive commentary node is configured to assume control of a player's view of the video game when activated.

6. The method of claim 1, wherein the player of the video game receives a video game reward for playing a defined number of interactive commentary nodes.

7. The method of claim 1, wherein at least one interactive commentary node is configured to render a scene in a split-screen mode, wherein a portion of the screen displays a rendering of the scene in one configuration, while another portion of the screen displays the scene rendered in another configuration, the split-screen mode displaying-application of different game creation techniques between the split-screen displays.

8. A network device to manage an interactive computer environment, comprising:
    a transceiver to send and receive data over a network; and
    a processor that is operative to perform actions, comprising:
        spawning a plurality of hidden interactive commentary nodes within a display of the interactive computer environment, the interactive computer environment being a multi-player game;
        detecting a condition, wherein the condition results in display of at least one of the hidden interactive commentary nodes;
        detecting another condition, wherein the other condition results in activating for playing of an interactive commentary associated with at least one of the displayed interactive commentary nodes and also separately performing at least one action, wherein the played interactive commentary and the performing of the at least one action displays to a user at least one of a feature of a video game creation technique; and while the activated commentary is playing, selectively preventing harm to an avatar of the user by at least another user, while allowing the avatar of the user to be harmed to prevent cheating by the user, and inhibiting display of the activated interactive commentary to another user in the game.

9. The network device of claim 8, wherein the processor is operative to perform actions, further comprising:

providing at least one reward based on activating a defined number of interactive commentary nodes.

10. The network device of claim 8, wherein activating an interactive commentary node further comprises modifying a display of the interactive commentary node including at least one of a shape, a size, an orientation, a color, or by pulsating of the activated commentary node.

11. The network device of claim 8, wherein detecting a condition resulting in displaying of an interactive commentary node further comprises detecting at least one of a player's avatar being within a defined proximity of a hidden interactive commentary node, a number of predefined events having occurred within the play of the interactive computer environment, an elapse of a defined time period since an earlier condition, or activating or displaying of at least one other hidden or inactive interactive commentary node.

12. The network device of claim 8, wherein detecting another condition resulting in activating of an interactive commentary further comprises at least one of the user's avatar touching the displayed interactive commentary node, the user's avatar looking at the displayed interactive commentary node, the user shooting at the displayed interactive commentary node, or an internal detected event determined from a sequence of events within play of the interactive computer environment.

13. A processor readable non-transitory storage medium that includes data and instructions, wherein when the data and instructions are executed within a computing device, the computing device performs actions for managing commentaries to a display of computer graphics, the actions comprising:

enabling a user to display at least a portion of the computer graphics having a computer generated virtual environment for a multi-player game;

detecting a first condition during the display, wherein the first condition results in displaying of at least one hidden interactive commentary node within the display of the computer generated virtual environment;

detecting a second condition, wherein the second condition results in activating for play an interactive commentary associated with at least one of the displayed interactive commentary nodes and also separately performing at least one action, wherein playing of the at least one interactive commentaries and performing of the at least one action displays to the user at least one of a feature of a video game creation technique; and while the activated commentary is playing, selectively preventing harm to an avatar of the user by at least another user, while allowing the avatar of the user to be harmed to prevent cheating by the user, and further inhibiting display of the at least one activated interactive commentary to another user in the game.

14. The processor readable non-transitory storage medium of claim 13, wherein playing of the interactive commentary comprises performing at least one of repositioning the user's viewing position, overlaying a video commentary using a virtual actor, or enabling the user to interact with a computer generated technology associated with an aspect of explaining how the computer generated virtual environment is created.

15. The processor readable non-transitory storage medium of claim 13, wherein detecting the second condition further comprises detecting at least one of the user touching a displayed interactive commentary node, or the user employing at input device to proactively activate a displayed interactive commentary node.

16. The processor readable non-transitory storage medium of claim 13, wherein detecting the second condition further comprises automatically detecting a defined state of the computer generated virtual environment.

17. A system for managing a commentary to an interactive computer environment over a network, comprising:

a client device that is configured to receive a user's input, provide the user's input over the network, and to display the interactive computer environment for a multi-player game; and a server device that is configured to perform actions, including:

spawning a plurality of hidden interactive commentary nodes within a display of the interactive computer environment;

detecting the user input, wherein the user input results in display of at least one of the hidden interactive commentary nodes;

detecting a condition within the interactive computer environment, wherein the condition results in activating for play at least one interactive commentary associated with at least one of the displayed interactive commentary nodes and also separately performing at least one action, wherein playing of the at least one interactive commentary and performing the at least one action displays to the user at least one feature of a video game creation technique; and while the at least one activated commentary is playing, selectively preventing harm to an avatar of the user while still allowing the avatar of the user to be harmed to prevent cheating by the user, and further inhibiting display of the at least one activated interactive commentary to another user.

18. The system of claim 17, wherein the user input further comprises at least one of navigating of the user avatar within a defined volumetric area surrounding at least one of the hidden interactive commentary nodes.

19. The system of claim 17, wherein playing at least one of the interactive commentaries further comprises performing at least one of playing an alternate scene, overlaying a video, pausing an underlying play of the interactive computer environment, or controlling a visual perspective of the user.

20. The system of claim 17, wherein playing at least one of interactive commentaries further comprises automatically playing at least one other interactive commentary.

* * * * *